Patented Feb. 17, 1931

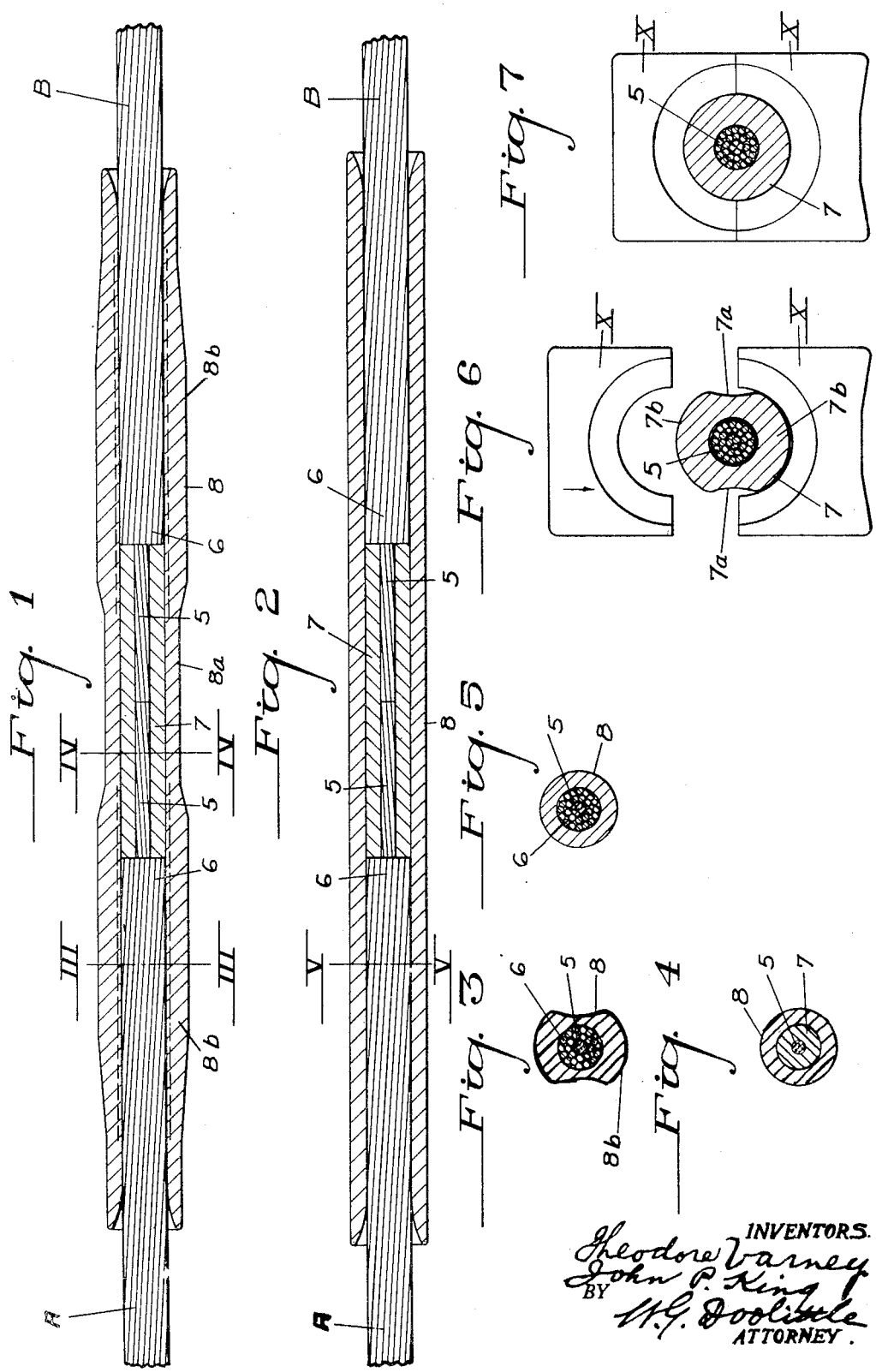

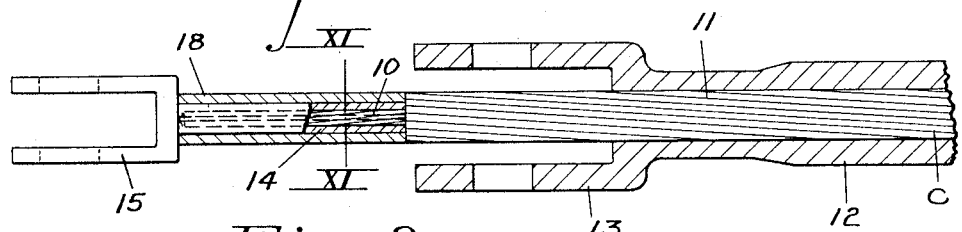
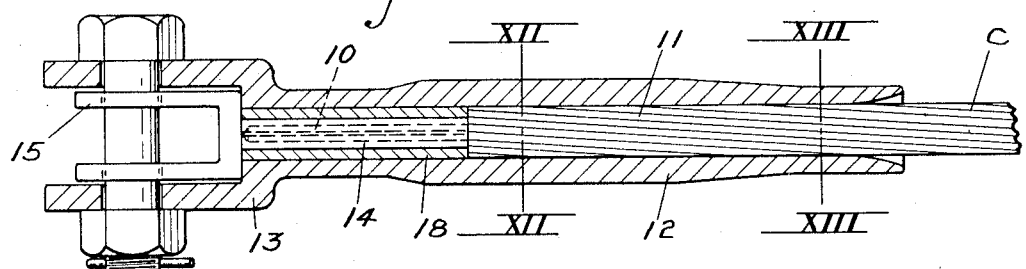
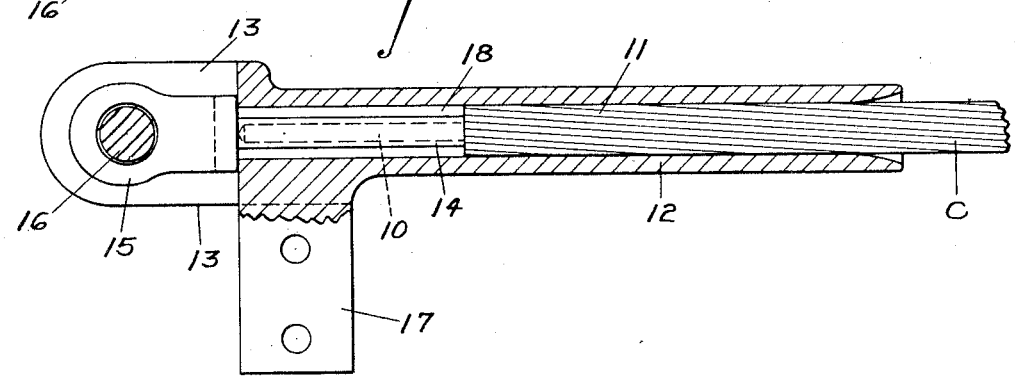
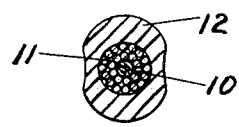

1,793,293

UNITED STATES PATENT OFFICE

THEODORE VARNEY, OF SEWICKLEY, AND JOHN P. KING, OF PITTSBURGH, PENNSYLVANIA, ASSIGNORS TO ALUMINUM COMPANY OF AMERICA, OF PITTSBURGH, PENNSYLVANIA, A CORPORATION OF PENNSYLVANIA

FITTING FOR COMPOSITE CABLES AND METHOD OF APPLYING SAME

Application filed May 18, 1925. Serial No. 31,233.

The present invention relates to composite cables used in electric power transmission lines, and particularly to fittings therefor and the method of applying such fittings.

Cables of the kind referred to as composite cables are those cables having a core, usually of stranded steel, of high tensile strength, around which is an envelope of conducting material, usually aluminum or copper, and more ductile and of less ultimate strength than the steel core.

In forming joints in a cable of this nature, or in forming dead end connections therefor, it is necessary to provide a union which will have a high tensile strength, easily capable of sustaining the pull or weight of the line or the span at such point, and wherein there can be no relative movement or slippage between the steel core and the envelope which would tend to put undue strain on the conducting envelope.

It is desirable, also, that the joint or dead-end fitting be of a nature that it will not injure the conducting envelope, and be of a nature that it can be easily and conveniently formed in the field.

Another desirable characteristic of such a fitting is that it be as light as possible, in order to minimize its moment of inertia as the mass of such a body tends to reflect mechanical vibrations in the line and ultimately tends toward a fatigue of the metal at or adjacent to such fitting. A reduced mass of the fitting tends toward greater flexibility, particularly in a dead-end fixture, and insures longer life of the cable.

The present invention has for its objects to provide fittings possessing the above mentioned desired characteristics, combining light weight with the necessary strength, developing in fact practically the full strength of the cable, and of good electrical, as well as mechanical, efficiency.

A further object of the present invention is to provide a fitting and method of applying the same which may be conveniently practiced in the field, and which may, in fact, utilize equipment similar to that now generally used.

These and other objects and advantages are attained by our invention, which may be readily understood by reference to the accompanying drawings, in which:

Fig. 1 shows a longitudinal section through a partially completed joint embodying the invention;

Fig. 2 is a similar view of the completed joint;

Fig. 3 is a transverse section on line III—III of Fig. 1;

Fig. 4 is a transverse section on line IV—IV of Fig. 1;

Fig. 5 is a transverse section on line V—V of Fig. 2;

Fig. 6 represents diagrammatically the first step in the method of applying the fitting, showing the pressing die open;

Fig. 7 is a view similar to Fig. 6, showing the pressing operation completed;

Fig. 8 represents a longitudinal section through a partially applied dead-end fitting;

Fig. 9 is a view generally similar to Fig. 8, showing the fitting further assembled;

Fig. 10 is a view similar to Fig. 9, but showing the clamp turned at right angles to the position of Fig. 9;

Fig. 11 is a transverse section on line XI—XI of Fig. 8, but before the application of the filler;

Figs. 12 and 13 are transverse sections on lines XII—XII and XIII—XIII, respectively, of Fig. 9.

Referring first to Figs. 1 to 5 inclusive, the fitting shown is a joint between abutting cable ends. In Figs. 1 and 2, A and B represent the adjoining ends of composite cables, having a steel core 5, and a stranded conducting envelope 6, preferably of aluminum or copper. The conducting envelope 6 of each of the abutting ends is cut away, laid bare or denuded as shown, and the two exposed core ends are inserted in a steel sleeve 7, preferably of the same diameter as the diameter of the composite cable. This sleeve is then pressed onto the metal, the construction of the sleeve and the method of pressing being hereinafter more fully described. The metal sleeve as thus pressed on, into intimate contact with the steel cores, forms a practically perfect joint. Surrounding the steel sleeve and projecting over the exterior of the cables a short distance, is a second sleeve 8, preferably of a relatively soft material possessing high electrical conductivity, for instance, aluminum or copper. This sleeve is applied and pressed on into intimate contact with the conducting layers, as hereinafter more fully described.

In forming the joint, the conducting envelope of the cable is cut away, as above mentioned. Before the ends of the cable are inserted in the steel sleeve 7, the outer conducting sleeve is slipped over one of the cable ends and moved back out of the way. Then the steel sleeve is applied.

This sleeve is originally of a cross sectional shape, as shown in Fig. 6, having diametrically opposite grooves or mutilations 7a, while its diameter across the curved sides 7b is slightly greater than the diameter of a circle whose radius would be the radius of the curvature of the two curved surfaces. This is so that the sleeve will compress into a true circle when the sleeve is pressed, as hereinafter mentioned. The bore of the sleeve is such that the ends of the steel core will closely fit therein.

When the ends of the steel cores are in the sleeve, the joint is placed between dies X, as shown in Fig. 6, these dies being in a suitable press, of a type commonly used in the field in making present types of joints, the press not being shown.

As the dies are brought together by the press, pressing against the curved sleeve, metal flows into the mutilated part of the sleeve, rounding it out, as shown in Fig. 7, at the same time forcing the metal of the sleeve into a binding engagement with the steel cores of the cables.

It has been found that such a joint develops practically the full strength of the core, so that it is absolutely dependable. By reason of the mutilations in the sleeve, the metal may have a proper flow under compression without the production of fins or projections on the sleeve, and without any appreciable elongation capable of producing slippage of the cable ends during the formation of the joint.

After the steel sleeve has been pressed onto the cores, at which time it is preferably fully circular and of a diameter equalling the diameter of the composite cable, the outer conducting sleeve 8 is slipped up over the joint. This sleeve preferably has a central cylindrical portion 8a and end portions 8b of a cross section generally similar to that of the steel union 7 as originally formed, and as shown in Fig. 3. The parts of this sleeve at each end of the central part may be pressed in dies in a manner similar to the way in which the steel sleeve is pressed, firmly uniting the conducting envelope of the cables and making a good electrical connection. When properly compressed, the sleeve 8 is of substantially uniform diameter and shape and has no fins or projections but is slightly elongated as appears from a comparison of Figs. 1 and 2.

The parts of the joint as thus constructed can be cheaply manufactured, and the joint can be quickly and easily made in the field. The mass of the joint is relatively low, which is of added advantage.

The same principle of the line joint as thus described may be applied to a dead-end connection for the cable. Figs. 8 to 13 inclusive illustrate the applicability of the method to a dead-end fixture. The fixture involves the general idea of a dead-end fixture disclosed in a co-pending application of Theodore Varney, filed May 21, 1925, Serial No. 31,779.

In Figs. 8 to 13 inclusive, C is the end of a composite cable having a steel core 10 and a conducting envelope of relatively soft material 11. The end of the conducting envelope is first cut back to expose the core. A conducting sleeve 12 terminating in an integral clevis 13 is slipped over the end of the cable and pushed back from such end to the position shown in Fig. 8. The greater portion of the length of the sleeve is of an irregular mutilated cross sectional shape corresponding to the cross sectional shapes of sleeves 7 and 8 previously described. This is clearly shown in Fig. 12.

A smaller sleeve 14 is then fitted over the exposed steel core. This sleeve is of the same cross sectional shape as the sleeve 7, as previously described, its cross sectional shape being shown in Fig. 11. The outer end of the sleeve terminates in and is preferably integral with a clevis 15. This clevis is of such dimension that it may be received in the clevis 13.

After the clevis sleeve 14—15 has been fitted onto the end of the steel core, the sleeve is pressed in the manner hereinbefore described, securing the sleeve to the core. The outer sleeve is then slipped forward until its clevis 13 embraces the clevis 15 when a pin 16 may be put through the registering holes in the clevis. The outer sleeve 12 may then be pressed onto the outer conducting envelope, and there is no possibility of any slippage between the core and the conducting envelope. At 18 is indicated a filler which may or may not be used, as desired.

This fitting may be made very light so as to weigh considerably less than previous types of heavy duty dead-end fixtures. This has several advantages, in that it renders the handling of fixtures more convenient, reduces the weight of the line, and has a lower moment of inertia to resist mechanical vibrations in the line. This results in a dampening of vibrations without violent reflection thereof back into the span, thereby tending to reduce the liability of the cable to break at its point of support and insuring a greater life for the cable.

An important advantage of the present dead-end fixture resides also in the provision of a lug 17 on the outer member 12 which is machined to provide a point of attachment for a jumper or lead-in connection, not shown.

While we have illustrated a preferred structure and method, it will be obvious that various changes and departures are contemplated within the spirit of the invention.

We claim:

1. The method of connecting a composite cable having an inner steel core and an outer conducting envelope with a composite connecting member having an inner high tensile non-circular tubular part of substantially the same diameter as said envelope and an outer conducting tubular part of non-circular cross section of a different metal from said connecting member and of high electrical conductivity which consists in baring a length of the steel core at the end of the cable, slipping the tubular outer connecting part over the end of the cable and sliding it back out of position, fitting the exposed core into the inner high tensile part, subjecting said inner part to transverse pressure in dies to bind it onto the core and force it to a substantially circular cross section, moving the outer connecting part back into position enclosing said inner tubular part, and pressing such part into intimate binding contact with the conducting envelope.

2. A connector for cables comprising a sleeve of workable metal adapted to receive the end of a cable, said sleeve being of non-circular cross-sectional shape and having a circular opening therethrough, said sleeve having opposed concaved recesses extending longitudinally along the outside thereof.

3. The combination with two cable ends, which cables have a high tensile core and an outer conducting envelope, the ends of the cores projecting beyond the ends of the envelopes, of a high tensile sleeve into which the cores of the cable ends are coaxially entered and which has binding engagement with said cable ends, said sleeve being of the same diameter as the outside diameter of the cables, and a second sleeve fitted over the first and longer than the first, said second sleeve being of a different metal from the first sleeve and of high electrical conductivity and compressed substantially throughout its length into binding engagement with the first sleeve and with the conducting envelopes of the cables.

In testimony whereof we affix our signatures.

THEODORE VARNEY.
JOHN P. KING.